United States Patent
Steinmetz et al.

(10) Patent No.: US 10,824,194 B2
(45) Date of Patent: Nov. 3, 2020

(54) MULTI-BLADE DEVICE DISPENSING SYSTEM

(71) Applicant: CaptureTech LLC, Baltimore, MD (US)

(72) Inventors: Jay Steinmetz, Baltimore, MD (US); Maarten A. Anderson, Haarlem (NL)

(73) Assignee: CaptureTech LLC, Baltimore, MD (US)

( * ) Notice: Subject to any disclaimer, the term of this patent is extended or adjusted under 35 U.S.C. 154(b) by 310 days.

(21) Appl. No.: 15/949,830

(22) Filed: Apr. 10, 2018

(65) Prior Publication Data

US 2019/0310685 A1    Oct. 10, 2019

(51) Int. Cl.
| | |
|---|---|
| H01M 10/44 | (2006.01) |
| H01M 10/46 | (2006.01) |
| G06F 1/16 | (2006.01) |
| H02J 7/00 | (2006.01) |
| H02J 7/02 | (2016.01) |
| H04W 4/80 | (2018.01) |

(52) U.S. Cl.
CPC .......... G06F 1/1632 (2013.01); H02J 7/0021 (2013.01); H02J 7/025 (2013.01); *H04W 4/80* (2018.02)

(58) Field of Classification Search
CPC .......... H02J 7/0042; H02J 7/355; H02J 50/10; G07F 11/50; G07F 11/165
USPC .......... 320/107, 108, 114, 115; 221/119, 125, 221/126, 129
See application file for complete search history.

(56) References Cited

U.S. PATENT DOCUMENTS

| | | | |
|---|---|---|---|
| 8,616,457 B2 | 12/2013 | Krawczewicz et al. | |
| 2007/0008073 A1 | 1/2007 | Poasevara | |
| 2017/0023546 A1* | 1/2017 | Holmes | G01N 1/4077 |

FOREIGN PATENT DOCUMENTS

WO   WO 2012154039   11/2012

* cited by examiner

*Primary Examiner* — Edward Tso
(74) *Attorney, Agent, or Firm* — Occhiuti & Rohlicek LLP

(57) ABSTRACT

Disclosed are implementations that including a device dispensing system that includes a rack comprising multiple slots to receive multiple modular blades, with each of the multiple modular blades including a plurality of adapters to receive a plurality of devices. The system also includes one or more modular blades received within respective one or more of the multiple slots, with at least a first one of the one or more modular blades configured to receive a first type of devices different from a second type of devices that at least a second one of the one or more modular blades is configured to receive. The system further includes a controller to control device docking for devices receivable into respective adapters provided in the one or more modular blades, to establish an electrical connection between the one or more devices and at least the controller.

20 Claims, 5 Drawing Sheets

MULTI-BLADE DEVICE DISPENSING SYSTEM

BACKGROUND

Business operations that involve the distribution and use of numerous inventory items (e.g., keys, communication devices, power storage devices such as batteries, etc.) require careful inventory control of such items, including the issuance (i.e., check-out), registration, and subsequent collection (i.e., return) of those inventory items. Such inventory control operations are time and resource consuming, and are prone to errors.

Some situations requiring effective and secure inventory control include: 1) issuing route keys to crews that service ATMs, banks, retail outlets and other facilities, with some routes requiring a large number of stops, 2) issuing fire arms, 3) issuing internal keys to branch doors and lockers, or 4) issuing other assets such as communication devices, hand-held scanners, and other accessories and tools. In these types of situations, accurately dispensing the correct items to the correct personnel, and accurately recording information pertaining to checked-out and checked-in items is paramount to successful completion of tasks by assigned personnel.

SUMMARY

The systems, devices, assemblies, methods, products, apparatus, and other implementations described herein include a device dispensing system that includes a rack comprising multiple slots to receive multiple modular blades, with each of the multiple modular blades including a plurality of adapters to receive a plurality of devices. The system also includes one or more modular blades received within respective one or more of the multiple slots, with at least a first one of the one or more modular blades configured to receive a first type of devices different from a second type of devices that at least a second one of the one or more modular blades is configured to receive. The system further includes a controller configured to control device docking for one or more devices receivable into respective one or more of adapters provided in the one or more modular blades received within the respective one or more of the multiple slots, to establish an electrical connection between the one or more devices and at least the controller.

Embodiments of the system may include at least some of the features described in the present disclosure, including one or more of the following features.

The one or more modular blades may include at least one of, for example, a mobile device blade with multiple mobile device cradles to receive multiple mobile devices, a charger blade with multiple charger cradles to receive multiple energy storage devices, and/or a key blade with multiple ports to receive multiple electronic key tags.

The one or more modular blades may include a mechanical locking blade received within one of the multiple slots. The mechanical locking blade may include multiple locking devices each configured to control physical removal of a corresponding device received within an adapter arranged in a neighboring blade received within a neighboring slot on the rack.

The multiple locking devices each may include a rotatable lever rotatably moveable between a first release position and at least a second lock position. In the at least second lock position, the rotatable lever physically may inhibit removal of an associated neighboring device received in an adapter of an adjacent blade received in an adjacent slot of the rack.

The rotatable lever may be configured to be rotatably moved between the first and the at least second position in response to a control signal from the controller generated upon a determination of a change in a docking state of the associated neighboring device.

The controller configured to control device docking for the one or more devices may be configured to electrically control docking state of an electronic device lockable into an adapter of one of multiple adapters of a blade installed into a slot in the rack, and record docking information related to the release or docking of the electronic device, the docking information comprising one or more of, for example, identity information for the electronic device, identity of a user receiving or returning the electronic device, temporal information related to the docking or release of the electronic device, and/or power measures for the electronic device.

The system may further include a charging system configured to controllably transmit power to the electronic device in response to a determination that the electronic device is locked into the adapter of the one of multiple adapters of the blade installed into the slot in the rack.

The charging system may include a wireless power transfer system to inductively charge the electronic device.

The system may further include a communication module to communicate with remote devices, including with the electronic device. The controller may be configured to receive, via the communication module, one or more communication messages relating to the electronic device, determine, based on the one or more communication messages relating to the electronic device, whether the one or more communication messages include a valid access authorization to dock or release the electronic device, and cause docking or release operations for the electronic device in response to a determination that the received one or more communication messages includes the valid access authorization.

The controller configured to receive the one or more communication messages relating to the electronic device may be configured to receive a message of the one or more messages from a rack user interface provided for the device dispensing system, or receive another message, of the one or more messages, communicated from the electronic device. The other message is communicated through one of, for example, a wireless link between the electronic device and the communication module, and/or a wired link established between the electronic device and the communication module.

The controller configured to receive, via the communication module, the other message communicated through the wireless link may be configured to receive one or more of, for example, a wireless short-range communication signal, a wireless medium range communication signal, and/or a wireless long-range communication signal.

The wireless short-range communication signal may include one or more of, for example, an RFID signal, a Bluetooth® signal, and/or a Bluetooth Low Energy (BLE®) signal.

The controller may further be configured to controllably actuate user-interface indicators, associated with adapters included with at least one of the one or more modular blades, to communicate information in relation to devices receivable within the adapters.

The user-interface indicators may be configured to indicate, for a particular adapter and a particular corresponding device, one or more of, for example, a release indication to prompt a user to remove the particular corresponding device from the particular adapter, a vacant indication identifying the particular adapter as being unoccupied, and/or a charging indication to indicate an in-progress charging operation for the particular corresponding device received in the particular adapter.

In some variations, a method is provided that includes providing a device receivable in an adapter included on a modular blade received in one of multiple slots on a rack configured to receive multiple modular blades, with each of the multiple modular blades including a plurality of adapters to receive a plurality of devices, wherein the modular blade is configured to receive a first type of devices different from a second type of devices that at least a second one of multiple modular blades is configured to receive. The method further includes receiving information communicated to a controller of the rack regarding the device, and controlling docking state of the device based on the received information regarding the device.

Embodiments of the method may include at least some of the features described in the present disclosure, including at least some of the features described above in relation to the device dispensing system, as well as one or more of the following features.

The device may be mounted onto the adapter, and controlling the docking state may include releasing the mounted device in response to a determination that a release message received in relation to the mounted electronic device is associated with an authorized user Releasing the mounted device may include controllably releasing a rotatable lever included in a neighboring blade, the rotatable lever configured to be rotatably moveable between a first release position and at least a second lock position. In the at least second lock position, the rotatable lever physically inhibits removal of the mounted device received in the adapter of modular blade.

Controlling the docking state of the device may include causing power charging of the mounted device in response to a determination that a power level of the mounted device is below a reference power threshold level.

In some variations, a mechanical lock system is provided that includes a mechanical locking blade received within one of multiple slots on a rack configured to receive multiple modular blades that each includes a plurality of adapters to receive a plurality of devices, with at least a first one of the multiple modular blades configured to receive a first type of devices different from a second type of electronic devices that at least a second one of the multiple modular blades is configured to receive, the mechanical locking blade including multiple locking devices configured to control physical removal of respective devices received within a plurality of adapters of a neighboring blade fitted within a neighboring slot of the rack. The mechanical locking system further includes the neighboring blade, fitted within the neighboring slot on the rack, and including the plurality of adapters, with the plurality of adapters positioned so that respective ones of the multiple locking devices are configured to be moved to control access to the plurality of adapters, and a controller configured to control movement of the multiple locking devices based on access authorizations determined for the respective devices associated with the plurality of adapters of the neighboring blade.

Embodiments of the mechanical lock system may include at least some of the features described in the present disclosure, including at least some of the features described above in relation to the device dispensing system and the method, as well as one or more of the following features.

The multiple locking devices may each include a rotatable lever rotatably moveable between a first release position and at least a second lock position. In the at least second lock position, the rotatable lever physically inhibits removal of an associated neighboring device received in a neighboring adapter of the neighboring blade received in the neighboring slot of the rack.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
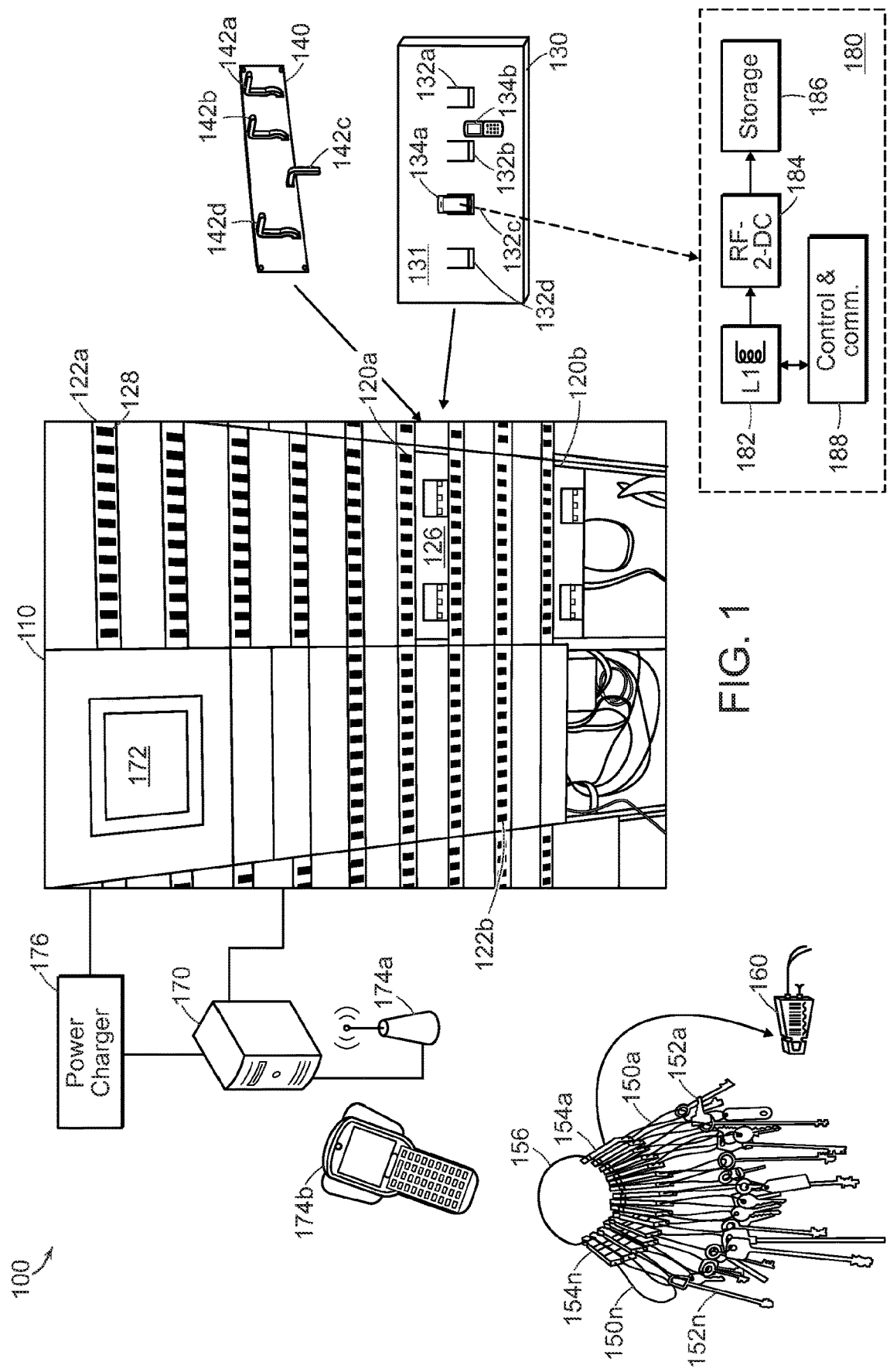
FIG. 1 is a diagram of an example device dispensing system to manage inventory control for a plurality of devices.

Described herein is a device dispensing system that uses multiple modular blades (that may be manufactured or produced by different manufacturers) to manage and control item dispensing (e.g., inventory control) for different types of devices produced as different types of blades employed. Each of a plurality of blade types may include multiple adapters (ports, cradles, other types of receiving structures) configured to receive and/or establish an electrical connection with different device types, such as keys (or key tags, also referred to as volume knobs, that can be received in appropriate ports), communication devices such as mobile phones, batteries and other types of energy storage devices, etc. The blades generally are structured as rectangular plates that fit within slots available on a rack. The blades may include mechanical and electrical adapter circuitries and structures (typically on the back portion of the blade) that mate or otherwise establish contact between the blades and complementary mechanical or electrical receiving structures provided within the rack in order to physically secure the blades to the rack, and allow electrical connections and control functionality to be established between the rack circuitry and circuitry available on the blades. The blades mounted onto available slots generally would be of dimensions compatible with the dimensions of the slots, but do not necessarily have to be electrically or mechanically compatible with the structure and circuitry of the rack in order to implement inventory control and management functionality (e.g., to securely dispense or check-in inventory items/devices). Rather, and as will be described in greater detail below, in situations where a first rack is not physically or electrically compatible with a blade mounted into an available, unoccupied slot in the rack, another rack may be mounted adjacent to the first rack, with the other rack being a mechanical locking blade with multiple locking devices that are each configured to control physical removal (and thus facilitate inventory management and control) of a corresponding device received in an adapter disposed on the first blade.

For example, a particular blade, such as a blade with multiple charging cradles for mobile devices (e.g., such as rack mounting charging plate manufactured by Portsmith of Boise, Id.), may be mounted onto an empty slot of a server rack (such as the KeyConductor server rack manufactured by CaptureTech of Nieuw-Vennep, the Netherlands). The charging cradles blade may not have circuitry compatible with the electronic circuitry of the server rack, in which case a separate locking blade, with mechanical locking levers that can be displaced between release and lock positions (e.g., moved down to inhibit physical movement of a device placed in a cradle, or moved up to a release position to allow unimpeded removal of the device in the cradle), can be mounted above the charging cradle blade. The operation of the locking blade can be controlled via the rack, thus allowing inventory control functionality, including physical release and docking of mobile devices into the charging cradle blade, and automatic recording of inventory and device dispensing information (e.g., identity of the device being dispensed, identity of user receiving or returning the device, date and time of the device dispensing event, etc.) Additionally, the rack may be configured to receive into other available slots other types of blades, including blades that are compatible with the particular server rack, such as key dispensing blades. Thus, a single server rack can be used to implement inventory control for different devices, using modular blades produced by different manufacturers. The actuation of levers of the mechanical locking blade can be controlled by the server (e.g., allow displacement of the levers only upon authentication of a user) and can facilitate tracking operations by the inventory control implementation (whether implemented by hardware, software, or a combination thereof) of the rack.

The implementations described herein include a system provided to simultaneously securely store and/or charge a mobile device (and/or other items/devices), while also utilizing (in some situations) the mobile device to communicate with the system (such as the multi-blade rack) to grant physical access to the device while capturing user and device information. The systems described herein include multiple components that when combined implement a solution that provides physical security (a locking mechanism) of mobile computer(s) and other devices, power recharging the mobile device's internal battery and or external battery (spare batteries), user access to unlock a specific mobile device via password or other user authentication methods (using, for example the mobile device, or a communal interface, as the user interface), determine and maintain device information (insertion time, removal time, user that removed the device, battery level at time of insertion and removal, etc.), and other related operations. Components of the systems described herein may include, receiving units (charging cradles, adapters, ports) provided in multiple modular blades that can each be fitted in slots provided in the rack system, a mobile client application (typically implemented as a software application executable on a processor-based controller of the rack) configured to control docking operations of devices managed by the rack and determine and manage information relating thereto, and optionally an authentication engine to verify identity of users seeking to receive or return devices to the inventory control systems described herein.

In an example implementation, an electronic device, such as a mobile device (e.g., a mobile computer, a mobile phone, etc.) is inserted into a locking charging device (cradle) provided on a modular blade mounted/secured to a receiving slot on the rack. When a sensor on the blade or cradle, and/or a central controller of the rack, senses an insertion event based on a connection to the charging interface, the mobile device may read the battery level of the mobile device and communicate (via a wired or a wireless link) the battery level, device ID (MAC address, etc.) to an authentication engine (which may be realized using the central controller) to inform the engine that the device was checked in. In some embodiments, the cradle (or some other type of port, adapter, or docking station) may be fitted with a locking mechanism (e.g., an electrically actuated mechanism, which may be implemented using an electromagnet) that is actuated to lock the device to the cradle/docking station (e.g., upon authentication of the device or user). In some embodiments, when the cradle or docking station is not equipped with a locking mechanism, a separate mechanical locking device or structure (such as a rotatable lever, as will more particularly be described below) may be actuated to be moved into a locking position secure inhibit the docked device from removal.

In the above example, to release a device, the user may enter the user's credentials (e.g., via the mobile device's user interfaces or via a central user interface coupled to the rack), which are then communicated to, for example, the authentication engine to verify access. If the user is authorized, the mobile client sends, in some embodiments, a removal message to the authentication engine that includes (information such as device ID, battery level, user ID) which is logged/recorded. In various examples, the charge level information for the mobile device may be compared to a minimum battery level parameter to ensure that a device with a defective battery (or that otherwise has not been docked long enough) is not released or dispensed. If the user's credentials are rejected, the mobile device is not released. Upon a successful authentication, the locking mechanism is released (e.g., releasing a solenoid of a locking mechanism fitted on the cradle or docking station, or releasing a similar mechanism that locks a rotatable lever to allow the lever to be moved to a release position) so that the user can remove the device.

Thus, in some embodiments, a device dispensing system is provided that includes a rack comprising multiple slots to receive multiple modular blades, with each of the multiple modular blades including a plurality of adapters to receive a plurality of devices. The system further includes one or more modular blades received within respective one or more of the multiple slots, with at least a first one of the one or more modular blades configured to receive a first type of devices different from a second type of devices that at least a second one of the one or more modular blades is configured to receive. The system additionally includes a controller configured to control device docking for one or more devices receivable into respective one or more of adapters provided in the one or more modular blades received within the respective one or more of the multiple slots, to establish an electrical connection between the one or more devices and at least the controller. In some embodiments, the one or more modular blades may include at least one of, for example, a mobile device blade with multiple mobile device cradles to receive multiple mobile devices, a charger blade with multiple charger cradles to receive multiple battery chargers, a key blade with multiple ports to receive multiple electronic key tags, and/or some other type of blade configured to receive for docking another device type (electronic or non-electronic). In some embodiments, the one or more modular blades may include a mechanical locking blade received within one of the multiple slots, with the mechanical locking blade comprising multiple locking devices each configured to control physical removal of a corresponding device received within an adapter arranged in a neighboring blade received within a neighboring slot on the rack. An example of a mechanical locking device may include a rotatable lever rotatably moveable between a first release position and at least a second lock position. The at least second lock position of the rotatable lever physically inhibits removal of an associated neighboring device received in the adapter of the neighboring blade received in the neighboring slot on the rack.

Also described herein are implementations that include a method comprising providing a device receivable in an adapter included on a modular blade received in one of multiple slots on a rack configured to receive multiple modular blades, with each of the multiple modular blades including a plurality of adapters to receive a plurality of devices (e.g., electronic devices, such as mobile devices, energy storage devices, and non-electronic devices). The modular blade is configured to receive a first type of devices different from a second type of devices that at least a second one of multiple modular blades is configured to receive. The method further includes receiving information communicated to a controller of the rack regarding the device, and controlling docking state of the device based on the received information regarding the device. In some embodiments, controlling the docking state may include releasing a mounted device in response to a determination that a release message received in relation to the mounted electronic device is associated with an authorized user. The release of the device may include controllably releasing a rotatable lever included in a neighboring blade, the rotatable lever configured to be rotatably moveable between a first release position and at least a second lock position, with the at least second lock position of the rotatable lever corresponding to a position in which the lever physically inhibits removal of the mounted device received in the adapter of modular blade.

Further disclosed herein is a mechanical locking system comprising a mechanical locking blade received within one of multiple slots on a rack configured to receive multiple modular blades that each includes a plurality of adapters to receive a plurality of devices, with at least a first one of the multiple modular blades configured to receive a first type of devices different from a second type of electronic devices that at least a second one of the multiple modular blades is configured to receive. The mechanical locking blade includes multiple locking devices configured to control physical removal of respective devices received within a plurality of adapters of a neighboring blade fitted within a neighboring slot of the rack. The system further includes the neighboring blade, fitted within the neighboring slot on the rack, and comprising the plurality of adapters, with the plurality of adapters positioned so that respective ones of the multiple locking, devices are configured to be moved to control access to the plurality of adapters. The system additionally includes a controller configured to control movement of the multiple locking devices based on access authorizations determined for the respective devices associated with the plurality of adapters of the neighboring blade.

Thus, with reference to FIG. 1, a diagram of an example device dispensing system 100 to manage inventory control for a plurality of devices (which may correspond multiple device types) is shown. The system 100 includes a rack 110, which may be a cabinet-shaped rack, comprising multiple slots, such as the non-occupied slots 120a and 120b, and the occupied slots into which blades, such as the blades 122a, and 122b (FIG. 1, includes additional unmarked blades) are fitted. The slots may define rectangular opening with side wall that include fastening structures (e.g., grooves, apertures, etc.) that are configured to matingly receive pegs, pins, or dowels included on the receivable blades. Alternatively, the walls surrounding the slot opening may include projections (such as pins or pegs) that are received in corresponding apertures or grooves defined on contact surfaces of the blades that contact the frame walls defining the slots. Other fastening mechanism to facilitate the mounting of a blade into a slot (including magnets, screws, etc.) may alternatively, or additionally, be used. The rack 110 may include slots with uniform slot dimensions (to receive standard-size blades), or may include an assortment of slots of different slot dimensions. As further illustrated in FIG. 1, at least some of the slots may include a bank of adapters (i.e., adapters such as the adapter 126 included with the slot 120a) that are configured to couple to corresponding insertion structures provided on a back portion of the various blades (not shown in the figures) to, for example, establish mechanical and/or electrical connection between the blade insertion structures provided on a blade's back and the banks of adapters.

As noted, one or more of the rack's multiple slots receive respective one or more modular blades, with at least a first one of the one or more blades configured to receive a first type of devices that is different from a second type of devices that at least a second one of the one or more blades is configured to receive (the device may be an electronic device, such as a mobile device or a tag device, or a non-electronic device, such as various tools or accessories). The different devices are placed into adapters (such as ports, docking stations, cradles, etc.) that are disposed into individual blades. Typically, a modular blade will include multiple ports to receive respective multiple devices. For example, FIG. 1 schematically illustrates a blade 130 which includes four adapters or cradles (132a-d) that are each configured to receive mobile devices, such as the mobile smartphone 134a. The adapters 132a-d of the example blade 130 may be structure as a ledge-like protrusion, extending from a front surface 141 of the blade 140, with dimensions that are sufficient to place or rest mobile devices thereon. Any number of adapters, docking stations, cradles, ports, etc., may be provided on a modular blade such as the blade 130. Each adapter may optionally include electrical contacts (such as a mini or micro USB male (i.e., projection-shaped) connector) that couple into respective adapters (ports) on an electronic device to be mounted onto an adapter on the blade. Other types of electronic connectors may be used. When available, such electric contacts allow a charging device or unit within the rack (the rack may include one or more charging units, or may dedicate individual charging units for each blade, or even for each blade adapter) that is configured to charge the electronic device mounted to the adapter. An electric contact also allows the establishment of a wired communication link between the electronic device and the rack, to communicate information germane to the docking process. Such information may include electronic device information communicated from the electronic device to the rack (e.g., to a central controller in communication with the rack), including information about the electronic device (device identity, device characteristics, level of charge, etc.), or information provided from the rack (e.g., authorization and/or tracking code sent to the device when the device is about to be released, location information associated with some tasks with respect to which the electronic device is being released, etc.)

Another type of modular blade that may be fitted or installed onto an available slot on the rack 110 is a key blade (such as the blades 122a and 122b depicted in FIG. 1) comprising multiple ports to receive respective key tags. FIG. 1 illustrates an example of one or more items 150a-n (which in this example are keys dispensed to service personnel required access to multiple locations) that are tracked and managed by the system 100. Each of the one or more items 150a-n includes a respective one of traceable objects 152a-n (e.g., in the example of FIG. 1, the traceable objects are keys, but any type of item may be used) that is coupled, e.g., via a coupling member or mechanism such as a chain, a wire, or some other coupler type, to a respective one of wireless identification tags 154a-n. The identification tags 154a-n (also referred to as volume knobs) are configured to be received within ports, such as the port 128 of the blade 122a, on respective blades. In some embodiments, at least one of the wireless identification tags (devices) 154a-n may be a passive wireless identification device, such as an RFID device. e.g., a UHF RFID tag, comprising a microchip with an antenna, configured to utilize the energy of an incoming trigger signal from a wireless communication module to transmit in response to an interrogation or request message, a reply message that includes identification information associated with the particular wireless identification device transmitting the reply signal (and thus associated with the traceable object coupled to the particular wireless identification device). In some embodiments, the wireless identification devices employed are RFID-enabled seals (such as the KeyCop™, manufactured by CaptureTech, shown in greater detail as the device 160 of FIG. 1) to which the traceable objects (e.g., keys) are attached. In some variations, once attached, the traceable objects cannot be taken off the seal unless the wire is cut. A wireless identification device, such as the KeyCop™ device, may be available in multiple pairs of colors and can be laser engraved with any text, logo or barcode, and contain a standard Ultra High Frequency (UHF) RFID tag in which information, such as a specific identification number, can be stored. This allows the number of the seal to be retrieved in one of at least three different ways: by reading a non-coded number on the seal, by scanning a barcode, or by reading the RFID tag. In some embodiments, the wireless identification devices may include RFID labels, or RFID inlays, that are placed on the traceable objects (e.g., in situations involving traceable objects such as fire arms, where the use of a tag-based or seal-based wireless identification devices may hinder use of the traceable objects to be tracked).

In some embodiments, the transmission of identification information may occur in response to a triggering event or occurrence, e.g., authentication of a release request received with respect to the key tag (or with respect to a key, or some other traceable item, chained to the tag). Such a triggering event can also cause the particular tag/device within a particular port to be released (e.g., by electrical unlocking of the tag or device from the port, as will be discussed in greater detail below). Release of a key tag, such as any one of the tags 154a-n, may also cause an indicator element (a light element, such as a LED device) that is included either within the tag housings or on the blade in proximity to the corresponding port, to be activated to indicate to a user which tag has been released and can be removed from the corresponding port.

Another example of a modular blade that can be fitted into an available slot in the rack 110 is a modular blade with adapters to receive energy storage devices (e.g., power bricks, mobile device batteries, etc.) A blade similar to the blade 130 of FIG. 1, but with ports configured for mechanical and electrical attachment to the energy storage devices, may be used to receive such energy storage devices and to manage distribution thereof (i.e., for inventory management purposes). Thus, in some embodiments, the one or more modular blades of the system 100 may include at least one of for example, a mobile device blade with multiple mobile device cradles to receive multiple mobile devices, a charger blade with multiple charger cradles to receive multiple energy storage devices, and/or a key blade with multiple ports to receive multiple electronic key tags. As noted, other types of modular blades, configured to receive and manage other types of devices or items, may also be used.

As described herein, in some implementations, the adapters provided for at least some of the multiple modular blades installed in the rack 110 may be equipped with a locking mechanism, such as an electrical locking mechanism. For example, an adapter (a cradle or, port, such as any of the cradles 132a-d depicted in FIG. 1), or any of the ports in the blades of FIG. 1, may include an electric lock mechanism. The various electric lock mechanisms for any such adapters (the lock mechanism is not specifically shown in FIG. 1) may be electrically controlled (e.g., actuated) by a controller 170 (e.g., a processor-based controller) positioned inside the rack 110 or remotely from the rack 110. The electric lock mechanism is actuated from one locking state (e.g., locked) to another locking state (unlocked), or vice versa, in response to receiving an actuation signal. In some embodiments, the electric lock mechanism may include one or more of, for example, an electromagnetic lock (implemented based on an arrangement of a solenoid and an armature), an electrical-strike lock with a displaceable mechanical locking component, such as a pin or a shaft, that moves, (e.g., using an electrical motor or some other displacement mechanism), in response to electrical actuation, and is received in an appropriate aperture or opening defined on the housing of the device to be locked. The electric lock mechanism may be implemented in a fail-secure configuration, in which when electrical power is not delivered to the lock mechanism, the lock mechanism will be in a locked state lock (i.e., will prevent release of the device placed in the adapter). Thus, for example, in response to a determination that a valid access authorization code has been provided (i.e., it matches a previously stored access authorization code, or is determined, according to cryptographic signature, to have been received from an authorized user), power may briefly be delivered to the lock mechanism on the particular adapter holding a device (mobile device, a key tag, an energy storage device, etc.) to actuate the electric lock mechanism to an unlocked state so as to release the device held in the adapter. In such embodiments, when no power is delivered to the electric lock mechanism comprising the lock mechanism will remain locked. Alternatively, in some embodiments, an electric lock mechanism may be implemented in a fail-safe configuration, in which power delivery causes lock mechanism to be in a locked state, and termination of power delivery causes the electric lock mechanism to unlock (thus releasing any device locked into the adapter.

In operation, to release a locked docked device, an actuation signal to electrically actuate an electric lock mechanism may be generated in response to a determination that a communication message transmitted from a wireless device associated with a user (e.g., a wireless personal phone, such as the mobile phones 134a or 134b, or a tablet device) includes data that matches a pre-programmed data stored in a memory device of the controller controlling the electric lock actuation. The communication message may be a wireless or wired message sent from the wireless device to be accessed (if the device's interface is accessible to the user, and if the device's communication functionality are available for use even while docked on the adapter), or may be a wireless or wired message transmitted from a central interface in communication with the rack (e.g., an interface that includes a touchscreen such as the touchscreen 172). Wireless messages communicated using transceivers provided with, the devices docked within the various adapters on the blades, and/or wireless transceivers associated with the rack 100, may be configured according to WiFi-based protocol, an active or passive radio-frequency identification (RFID) protocol, a Bluetooth-Low-Energy® (BLE) protocol, Bluetooth®, long-range communication protocols (e.g., LTE or CDMA technologies and protocols, etc.), or any other communication protocol that a communication module is adapted to use. The device to be docked and the rack 110 this define a two-way radio system. If the controller controlling an electric lock mechanism associated with one of the adapters determines that its stored access authorization code matches the code included in the wireless message, or determines that the release request has been received from an authorized user (e.g., the message is cryptographically signed with a key associated with that user or device), the controller will electrically actuate the electric lock to cause the lock to change its locking state (e.g., be unlocked if the lock was previously locked, or be locked of the lock was previously unlocked). For example, in response to a determination that a decoded access code (received via a wired or wireless message) matches a stored access code, the controller may cause electrical current to be directed from a power source to the electric lock mechanism to actuate the electric lock mechanism.

As noted, in some embodiments, modular blades may lack circuitry to control the release or docking of devices docked into adapters of such modular blades, or circuitry that such adapters may have may not be compatible with control circuitry of the rack. In such circumstances, one approach that may be used to nevertheless control the docking operations for an individual device is to provide a mechanical locking blade that is installed within a slot that neighbors (e.g., is adjacent) to the slot into which a blade, with adapters that cannot be controlled by the rack, is fitted. Thus, FIG. 1 shows a blade 140 that includes multiple locking devices 142a-d that are each configured to control physical removal of a corresponding device (e.g., electronic device) receivable within an adapter arranged in a neighboring blade.

Figure 2A:
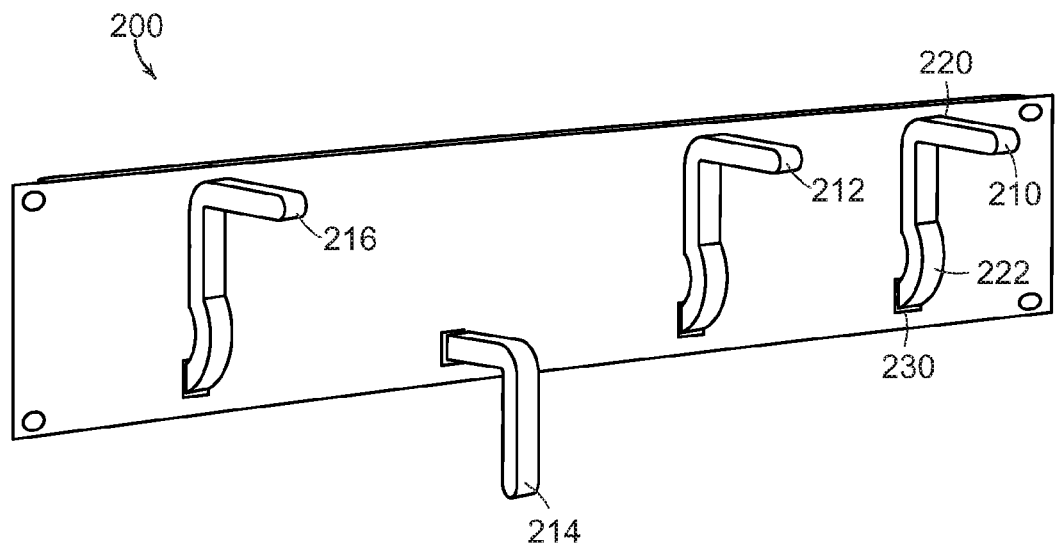
FIG. 2A is a perspective view diagram of a front side of a mechanical locking blade with multiple mechanical locking devices.

More particularly, with reference to FIG. 2A, a perspective diagram of a front side of a blade 200, which may be similar to the blade 140 of FIG. 1, and includes multiple locking devices 210, 212, 214, and 216. In the example of FIG. 2A, each of the mechanical locking devices 210-216 may include a rotatable lever rotatably moveable between a first release position and at least a second lock position, with the at least second lock position of the rotatable lever physically inhibiting removal of an associated neighboring device received in an adapter of a neighboring blade received in a neighboring slot of the rack. For example, in FIG. 2A, the rotatable lever 214 is illustrated in a lock position, which is similar to the lock position shown with respect to the mechanical lock device 142c of FIG. 1. When the blade 140 or 200 is received in a slot that is adjacently above a blade with adapters configured to receive devices such as mobile phones, placing the rotatable lever 142c (or 214 in FIG. 2A) in a lock position would impede (or altogether prevent) the physical removal of a mobile device such as the mobile device 134a placed in the adapter (cradle) 132c. The rotatable lever 214 (or 142c) may be configured to be rotated to multiple different locking positions (along an arcuate path define by the rotating of the rotatable lever) that depend on the dimensions of the device placed within the corresponding adapter that the particular lever is configured to block. For example, a bulkier device placed in an adapter provided in a blade located below the mechanical locking blade 140 or 200 may require the locking position to be farther removed from the blade than is required for a smaller device or adapter.

Figure 2B:
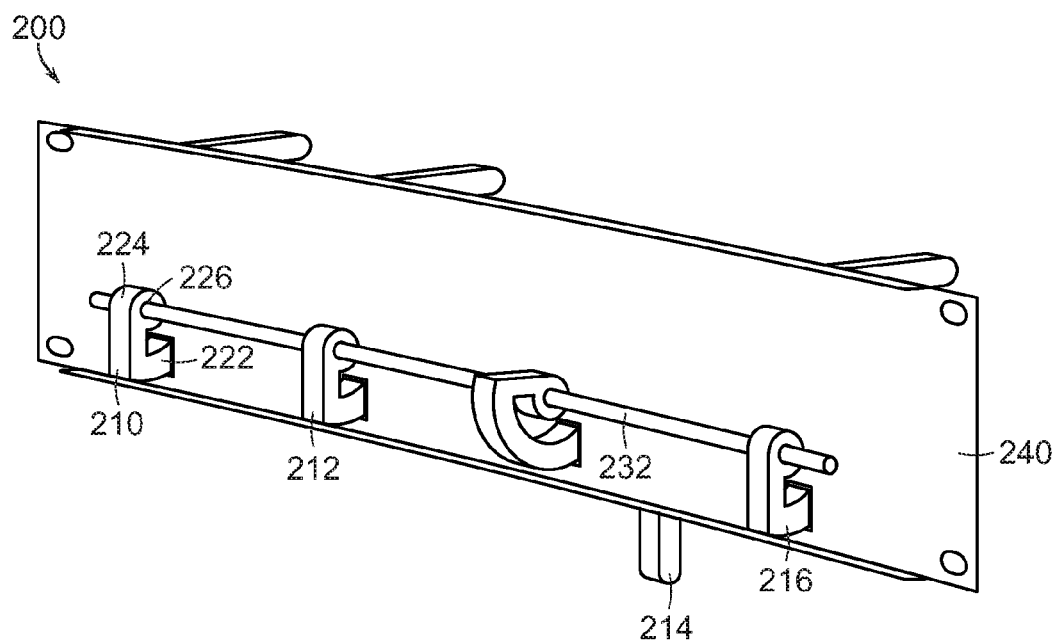
FIG. 2B is a perspective view diagram of a back side of the blade of FIG. 2A.

As further shown in FIG. 2A, and with further reference to FIG. 2B providing a perspective view of the back side of the blade 200, the example rotatable lever 210 (and similarly the other rotatable levers of FIGS. 1 and 2A-B) includes an L-shaped hook 220 that integrally extended from an arcuate portion 222. The arcuate portion 222 is passed through an aperture 230 defined in the blade 200. The back end of the arcuate portion is integrally connected to a sleeve 224 whose central hole 226 is fitted on a shaft 232 connected to a back surface 240 of the blade 200. The distance between the shaft 232 and the back surface 240 of the blade 200 is such that the sleeve 224 can rotate about the shaft 232, thus moving the L-shaped hook 210 to locked or release positions, as necessary. Other configurations, shapes, and structures for the mechanical lock devices (based on similar principles of operations as the rotatable levers 210-216 or 142a-d) may be used in place of the particular configuration of the rotatable lever 210. Movement of the rotatable lever 210 (or other similar mechanical locks) may be effected by a user applying mechanical force to the rotatable lever 210 to rotate the L-shaped hook 210 to lock or release positions. Alternatively, in some embodiments, each of the mechanical lock devices (in the example of FIGS. 1 and 2A-B these devices are rotatable levers) may be actuated by individual electrical motors that may be controlled by a central controller (such as the controller 170 depicted in FIG. 1). In response to an authenticated/verified communication message (from a user, provided via a user interface on the device to be docked, or via a central user interface for the rack 110) provided in relation to a user, and indicating that a corresponding device is to be docked or released from its corresponding adapter, the controller may cause the motor for a mechanical lock device, positioned on a blade above or below the blade comprising the corresponding adapter, to be activated and to actuate the mechanical lock device to the appropriate position.

Consider the following example illustrating the operation of mechanical lock devices, such as the lock devices 142a-d provided on the modular blade 140 depicted in FIG. 1. A user may wish to release the user's mobile device 134a which is docked into the adapter (cradle) 132c, and whose physical removal is inhibited by the rotatable member 142c that has been lowered into a lock position. The user may communicate that request via an appropriate app which may be provided through the user's phone interface, or via the central interface 172. The controller 170 may then authenticate the message, e.g., determine if it includes a valid user-access code, or a cryptographic signature associated with the user or the user's device. If the request is authenticated, the controller may cause the rotatable lever 142c to be rotated to a release position, or may prompt the user to rotate the lever (the location of the lever to be rotated may be indicated by activating an indicator associated with the lever, such as a LED light positioned proximate to the rotatable lever 142c). The release of the device 134a may also cause the controller to record information relevant to the release event, including the identify and/or characteristics of the device being released, the identity of the user taking delivery of the device, charge level for the device, etc. In some embodiments, the determination to release or not release a docked (and possibly locked) device may further depend on the charge state of the device. For example, if the charge level of the device is too low (e.g., it is below some pre-determined power reference threshold), the controller 170 may prevent the release of the device and inform the user about the problem (via the user interface through which the user is communicating). In another example, another user may wish to dock a mobile device 134b (which may be of a type similar Or different from the device 134a). This other user may therefore send a communication (e.g., wirelessly, via the device's wireless communication module, or via the interface 172) to the controller 170) indicating that the device 134b is to be docked. The controller receives the communication (which may also include information about the device, including the device identity, type, charge level, and other device characteristics, and information about the user) and determines whether the user and/or the device 134b is authorized to be received by the system 100 for docking in one of the adapters provided on one of the installed blades. Upon determination that the device may be docked (this determination may be based on an authentication of the user), the controller may determine that the device may not be compatible with adapters/cradles available on the rack 110 that can electrically lock the device 134b, and may thus determine that an unoccupied adapter (cradle) 132b may be available to receive the device. The controller may therefore indicate the location of the adapter to receive the device (e.g., activating an appropriate LED light in proximity to the adapter 132b), and may also indicate to the user (using another LED light in proximity to the rotatable lever 142b, or by other means) that once the device is placed in the cradle 132b, the rotatable lever positioned directly above that cradle needs to be rotated to put it in a locked position that would prevent unauthorized or uncontrolled removal of the device. As noted, in some embodiments, the rotatable lever 142b may be automatically rotated to the appropriate position using a motor controlled by the controller 170.

Because cradles of different blades may support different device types (with different sizes and dimensions), in some examples, the rotatable levers may be configured to have adjustable lock positions (i.e., the rotational lock position, 20°, 30°, or any other rotational position relative to a plane defined by the blade comprising the adapters/cradles) that are adjusted depending on the sizes of the devices to be received therein. In some embodiments, devices docked in such cradles (or other adapters for other blades) may include RFID circuits that identify the respective devices and thus can be used to determine the device's characteristics. The RFID circuits may be interrogated by an RFID reader included with the particular cradle on which the user is attempting to place the device (or included on the blade that comprises multiple such cradles, or on the rack itself). Upon receipt of an RFID transmission from the device, the controller can determine if the device is compatible with a cradle that a user may be trying to mount the device onto. If the device and cradle are incompatible, the system's controller may determine, based on the sent information an alternative adapter on the rack (on one of the blades) that can receive the device. In some embodiments, a rotatable lever may be prevented from being moved (to be lowered in order to lock the device) if it is determined that the device is not charging (e.g., because the device is not properly mounted on the cradle). A notification that the device is not charging may also be relayed to an operator and/or to the user. Sometimes units devices are put in a cradle incorrectly and therefore they would not be flush with the bottom. This could cause a problem if a lever is lowered and crushes the unit. However, if the unit had started to charge via contact charge, this would mean that the device is likely properly placed within the cradle, thus reducing the possibility of damage to the device as a result of moving a rotatable lever to lock the device. In such embodiments, data from the cradle may not necessarily be required to determine if charging operations are occurring. Instead, notifications from the mobile device management (MDM) software on the device can be used to make such determinations. The initiation of charging may be validated with a time stamp. It is noted that, generally, information about which cradle a device is being placed in may be known because the user is assigned the cradle that is to receive the device, and therefore the pairing of cradle and device is already known.

With continued reference to FIG. 1, as noted, in addition to controlling the docking operations (locking or releases various devices docked within adapters on the modular blades fitted into the rack), the controller 170 may further be configured to record and track inventory status for the devices and objected that are docked and managed on the rack, as well as control charging operations for devices that are docked at the rack 110. The controller 170 is electrically coupled to one or more wireless communication modules, such as wireless communication modules 174a-d, configured to wirelessly communicate with electronic devices or tags associated with devices, and/or communicate with the controller. The communication between the controller and devices to be docked at the rack may be based on short-range protocols, such as RFID, BLE, etc., based on WLAN protocols, such as WiFi, or based on long-range communication protocols. In some embodiments, the controller 170 may communicate with docked devices and tags via wired communication links. When configured to communicate with devices (or tags) based on, for example, an RFID protocol, the controller 170 and communication modules 174a-d may be configured to transmit a trigger/interrogation signal that is received by RFID circuits for those devices. The trigger signal may be sent by the communication module in response to a user request, as a result of periodic transmissions of trigger signals, based on an initiating signal transmitted from a dockable device. Upon receiving the trigger signal(s), the RFID circuits of the dockable devices (e.g., key tags, mobile devices, power chargers, and so on) are configured to transmit a reply/answer signal(s) that includes information representative of an identifier(s) associated with the respective devices. The controller 170 may also be configured to control/adjust the transmission power at which the wireless communication modules 174a-d are to operate, and/or to control/adjust the data rate at which the wireless communication modules are to communicate with, for example, the devices received by the blades of the rack 110.

Communication between the wireless communication module 174a-d and the devices and tags to be wireless identification devices may not necessarily be limited to radio frequency (RF) communication, but may include various other forms of wireless communication, such as, for example, infrared (IR) communication, and may also be based on optical scanning of graphical or visual features (e.g., barcodes, QR codes, etc.) For example, the communication module 174b may be equipped with an optical scanner to perform optical scanning operations.

The controller 170 (which may be realized as a computing system) is configured to perform (alone, or in combination with other remote servers/computing systems with which the controller 170 may establish communication links via a wired or wireless network) the processes and operations to track and perform inventory management with respect to one or more items. For example, the controller 170 may be configured to maintain/manage a database (in electrical communication with the system 170) to record traceable devices and objects (e.g., keys, fire arms, ammunition, portable/personal communication devices, etc.) that are to be tracked. An example of a database application that may be used/implemented on the controller 170 is an SQL-based database system (which may comprise part of the controller).

When a device or tag is docked at one of the adapters provided on the various modular blades, the controller 170 may either receive, through one of its communication modules, a wireless message (which may have been initiated by a user through a user interface on the device to be docked, or it may initiate a communication exchange (e.g., an RFID communication exchange) with the dockable device. In some embodiments, the controller may initiate communication with the device when it detects that the incoming device has been placed in an unoccupied adapter (e.g., as a result of electro-mechanical actuation of a switch on the adapter, the establishment of an electrical connection, etc.) The communication exchanges between the controller 170 and any device that is to be docked may include data, transmitted to the controller, representative of one or more of the device identity, user identity, device characteristics (e.g., device type), power level of an energy storage device used by the incoming device, weight of the device or object (if not known, the weight can be measured, and used as a way of confirming the identity of the device). Where the device to be docked does not have wireless capability, or the device's communication capabilities are incompatible with those used by the controller 170, information about the device and/or user in possession of the device may be provided via the central user interface 172 (which may be a touchscreen). The central interface 172 may also be used when communication through an interface of the device to be docked is inconvenient (e.g., if the keypad of the device is too small or limiting to quickly enter information, or is not reachable if the device has already been placed into an available adapter that is too difficult to interact with if it is positioned too high or too low).

Wireless signals transmitted by a user's wireless device to the controller 170 may need to be authenticated before the user device is allowed to be docked at the rack 110. The authentication may be performed at an authentication engine, which may be implemented as part of the controller 170, or may be realized as a separate module. Authentication of wireless communications sent to the controller may be performed by the device (or user using the device) providing a code that is compared to previously enrolled codes associated with various users or devices that are to be managed by the system 100. As noted, in some embodiments, authentication may be performed through cryptographic signature. For example, a validation function (e.g., hash function such as SHA-0, SHA-256, or any other appropriate validation function) may be applied to a payload of a message to be transmitted and the resultant validation results are encrypted with a secret key available at the authenticating device (e.g., a private key of a private-public cryptographic key pair). The encrypted record is included with the message comprising the payload to be transmitted and transmitted to the controller. The controller 170 may then decrypt the encrypted record, and independently apply the same validation function to the payload. If the decrypted message and the independent hash result match, this may be indicative that the message was received from a legitimate source (i.e., a source using the correct secret key).

When a device is to be undocked and dispensed distributed to a user (e.g., to provide the user with a mobile device, keys, and other equipment for completion of some task, or when a user retrieves personal property such as some device the user previously docked at the rack for safekeep and recharging purposes), the user may enter the user's credential through an interface of the device it is to receive or via the central interface. The credentials may be provided by entering a validation code, entering data obtained through the reading of a magnetic card, scanning a graphical code, sending a cryptographically signed transmission, etc. Upon authentication of the user's credentials, the controller may release equipment (devices, keys, firearms, etc.) associated with the authenticated user. The devices to be released may have been determined based on some previously entered data that identifies the equipment/accessories that need to be dispensed to that particular user. The release of the devices and other equipment may include unlocking such device locked into their respective adapters (e.g., releasing electromagnetically locked equipment), actuating mechanical lock devices (such as the mechanical lock devices of FIGS. 2A and B) to their release positions, and recording information relating to the equipment being released. Such information may include identity of the devices released, identify of the user receiving such devices and equipment, and recording other relevant characteristics associated with the devices and equipment, including power levels, weight of the items released (which may be measured using a scale that is provided with the system 100). As noted, in some embodiments, the controller may determine that a particular device or other items has a power level in the item's energy storage device that is below some pre-determined reference threshold and consequently may issue a warning to alert the user and/or an administrator of the problems. In some embodiments, the controller, in response to a determination that the power level for a particular device is below its respective threshold, may cause the device lock to remain activated to thus prevent removal of the particular device.

As further shown in FIG. 1, coupled to the controller 170 is coupled to a power charger 176 that is configured to control charging operations to various docked devices that have been placed into respective adapters of the blades on the rack 110. The power charger 176 may include a high power wireless transmitter configured to transmit strong RF signals at a frequency compatible with receiving circuits of various docked devices that are configured for inductive power transfer. The wireless power transmitter of the power charger may additionally be configured to communicate (data and control signals) with one or more of the devices docked into the rack 110 (e.g., if the docked devices support the communication protocols that the wireless power transmitter supports). The power charger 176 may also be configured to charge docked devices that are able to establish wired electrical connection to the charger 176 upon being received by respective adapters. In some implementations, the power charger may be configured to charge a docked device only if the power level determined for that docked device is below some predetermined threshold (i.e., so as to avoid unneeded charging if the power level of the device's energy storage is high enough, e.g., about 90%).

In embodiments in which the power charger 176 is needed to wirelessly charge a device (e.g., such as the mobile devices 134a or b, which may not be compatible with the wired electrical circuitry available via the slots), these devices may include the circuitry of an inductive wireless receiver 180 illustrated in FIG. 1. An inductive wireless power receiver generally includes an RF transducer circuit to receive RF transmissions, with such a circuit comprising one or more coils, such as a coil 182 (also referred to as an antenna element). In some embodiments, the power receiving functionality may be implemented, at least in part, using capacitance elements (rather than based entirely, or partially, on inductive elements such as the coil 182). The coil 182 is coupled to an RF-to-DC conversion circuit 184 that may also be configured to process or condition the resultant DC current (e.g., through further filtering and/or down-conversion operation to a lower voltage level). The DC output of the RF-to-DC converter is provided to a storage device 186 realized, for example, as a capacitor(s), a battery, etc.

In, some embodiments, the wireless power receiver may also include a control and communication module 188 configured to establish and communicate data and control signaling via a communication channel between the wireless power receiver 180 and a transmitter (e.g., a transmitter provided as part of the power charger 176, which may be implemented, in part, using the communication modules 174a or 174b). The exchange of data and control signaling may be performed either through the same channel through which RF power is transferred (e.g., in-band communication, which can be implemented through modulation of data on the carrier high RF power signal received by the wireless power receiver 180), or via a separate communication channel (out-band channel such as a WiFi-based channel, a long-range cellular channel, a near-range channel such as Bluetooth, Bluetooth Low Energy, ZigBee, etc.) Control functionality of the wireless power receiver 180 may include a tuner adjustment (e.g., impedance matching) capability, e.g., to controllably adjust a resonant frequency of the transducer 182 to more efficiently receive and convert power transmitted from the power charger 176.

In some embodiments, the control and communication module 188 may also be configured to determine if power transmitted from a powering transmitter implemented as part of the power charger 176 is intended to charge a particular device. For example, the particular device (such as the device 134a) may be assigned a particular identifier or access code. Power charging operations may be permitted, in some implementations, when the power transmitter includes with its charging RF transmissions (e.g., through in-band or out-band communication) the particular identifier associated with the particular device. To enhance security features of the wireless power transfer performed by the system 100, communications between the transmitter and the wireless power receiver may be encrypted and/or signed to authenticate the source of the transmission.

Figure 3:
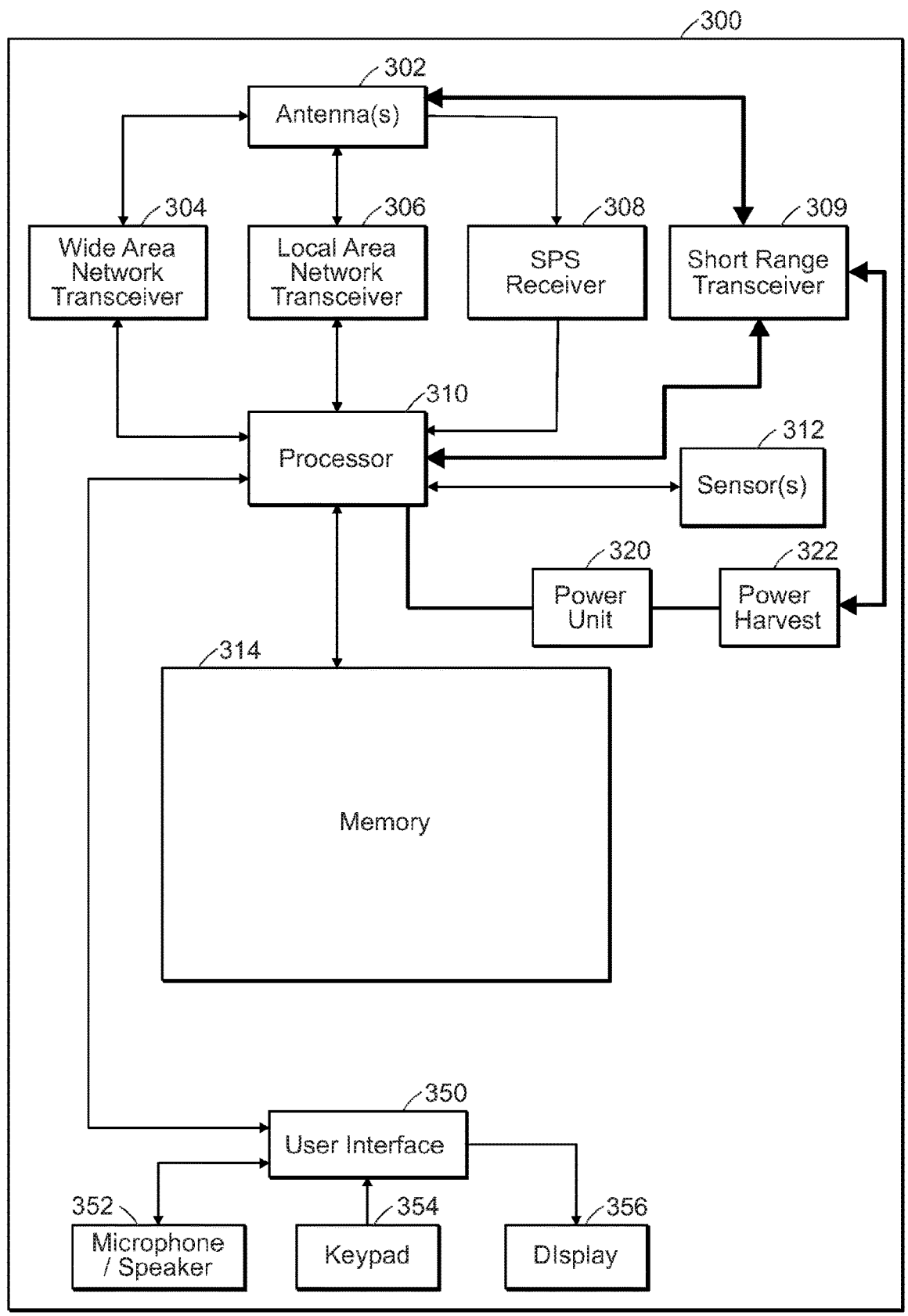
FIG. 3 is a schematic diagram of an example device which may be used to implement some of the various devices, nodes, and elements depicted in FIG. 1.

With reference now to FIG. 3, a schematic diagram of an example device 300, which may be used to implement, at least in part, the various devices, nodes, and elements depicted in FIG. 1, including, for example, the controller 170, the mobile devices 134a-d, and/or any controllers or circuitries implemented with respect to the adapters or blades described in relation to FIG. 1. It is to be noted that one or more of the modules and/or functions illustrated in the example of FIG. 3 may be further subdivided, or two or more of the modules or functions illustrated in FIG. 3 may be combined. Additionally, one or more of the modules or functions illustrated in FIG. 3 may be excluded.

As shown, the example device 300 may include one or more transceivers (e.g., a LAN transceiver 306, a WLAN transceiver 304, a short-range transceiver 309, etc.) that may be connected to one or more antennas 302. The transceivers 304, and 306, and/or 309 may comprise suitable devices, hardware, and/or software for communicating with and/or detecting signals to/from a network or remote devices, and/or directly with other wireless devices within a network. In some embodiments, by way of example only, the transceiver 306 may support wireless LAN communication (e.g., WLAN, such as Win-based communications) to thus cause the device 300 to be part of a WLAN implemented as an IEEE 802.11x network. In some embodiments, the transceiver 304 may support the device 300 to communicate with one or more cellular access points (also referred to as a base station) used in implementations of Wide Area Network Wireless Access Points, which may be used for wireless voice and/or data communication. A wireless wide area network (WWAN) may be part of a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. In some embodiments, 4G networks, 5G networks, Long Term Evolution ("LTE") networks, LTE networks, Ultra Mobile Broadband (UMB) networks, and all other types of cellular and/or wireless communications networks may also be implemented and used with the systems, methods, and other implementations described herein.

As noted, in some variations, the device 300 may also include a near-field transceiver (interface) configured to allow the device 300 to communicate according to one or more near-field communication protocols, such as, for example, Ultra. Wide Band, ZigBee, wireless USB, Bluetooth® (classical Bluetooth), Bluetooth-Low-Energy® (BLE) protocol, etc.

As further illustrated in FIG. 3, in some embodiments, an SPS receiver 308 may also be included in the device 300. The SPS receiver 308 may be connected to the one or more antennas 302 for receiving satellite signals. The SPS receiver 308 may comprise any suitable hardware and/or software for receiving and processing SPS signals. The SPS receiver 308 may request information as appropriate from the other systems, and may perform the computations necessary to determine the device's 300 position using, in part, measurements obtained by any suitable SPS procedure. Such positioning information may be used, for example, to determine the location and motion of the various devices used in relation to the system 100.

In some embodiments, one or more sensors 312 may be coupled to a controller 310 to provide data that includes relative movement and/or orientation information. By way of example but not limitation, sensors 312 may utilize an accelerometer (e.g., a MEMS device), a gyroscope, a geomagnetic sensor (e.g., a compass), and/or any other type of sensor. Moreover, sensor 312 may include a plurality of different types of devices and combine their outputs in order to provide motion information. The one or more sensors 312 may further include an altimeter (e.g., a barometric pressure altimeter), a thermometer (e.g., a thermistor), an audio sensor (e.g., a microphone), a camera or some other type of optical sensors (e.g., a charge-couple device (CCD)-type camera, a CMOS-based image sensor, etc., which may produce still or moving images that may be displayed on a user interface device, and that may be further used to determine an ambient level of illumination and/or information related to colors and existence and levels of UV and/or infra-red illumination), and/or other types of sensors.

The controller 310 may include one or more microprocessors, microcontrollers, and/or digital signal processors, and customized control circuitry (e.g., implemented as application-specific-integrated-circuits, or ASIC) that provide processing functions, as well as other computations and control functionality. The controller 310 may also include memory 314 for storing data and software instructions for executing programmed functionality within the device.

The functionality implemented via software may depend on the particular device at which the memory 314 is housed, and the particular configuration of the device and/or the devices with which it is to communicate. For example, if the device 300 is used to implement a controller such as the controller 170, the device 300 may be configured (via software modules/applications provided on the memory 314) to implement a process to communicate with adapters provided on modular blades fitted within slots of a server rack and/or with various wireless devices, determine whether various devices are authorized to be docked or to be released, control lock and release states for various devices (ports, adapters, mobile devices, and the mechanical lock devices described in relation to FIGS. 2A-B), control power charging functionality with respect to docked devices, control and manage distribution of devices that are docked on a rack such as the rack 110, and perform other processes described herein. The memory 314 may be on-board the processor 310 (e.g., within the same IC package), and/or the memory may be external memory to the processor and functionally coupled over a data bus. Further details regarding example embodiments of a processor or computation system, which may be similar to that of the processor 310, are provided below in relation to FIG.

With continued reference to FIG. 3, the device 300 may include a power unit 320 such as a battery and/or a power conversion module that receives and regulates power from an outside source (e.g., AC power, in situations where the device 300 is used to implement a mobile or stationary device to control a lock device). In some embodiments, the power source 320 may be connected to a power harvest unit 322. The power harvest unit 322 may be implemented, at least partly, similarly to the wireless power receiver 180 depicted in FIG. 1, and may be configured to receive RF communications, and harvest the energy of the received electromagnetic transmissions (although FIG. 3 illustrates the unit 322 receiving RF communication via the short-range transceiver 309, the power harvest unit 322 may be connected to, and receive RF energy from, any of the other communication interfaces depicted in FIG. 3). An RF harvest unit generally includes an RF transducer circuit to receive RF transmissions, coupled to an RF-to-DC conversion circuit (e.g., an RF-to-DC rectifier). Resultant DC current may be further conditioned (e.g., through further filtering and/or down-conversion operation to a lower voltage level), and provided to a storage device realized, for example, on the power unit 320 (e.g., capacitor(s), a battery, etc.)

The example device 300 may further include a user interface 350 (through which communication with the controller 170 of the system 100 may be implemented) which provides any suitable interface systems, such as a microphone/speaker 352, keypad 354, and display 356 that allows user interaction with the mobile device 300. A user interface, be it an audiovisual interface (e.g., a display and speakers) of a mobile device (such as the devices 134a-d of FIG. 1), or some other type of interface (visual-only, audio-only, tactile, etc.), are configured to provide status data, alert data, and so on, to a user using the particular device 300. The microphone/speaker 352 provides for voice communication functionality, the keypad 354 includes suitable buttons for user input, the display 356 includes any suitable display, such as, for example, a backlit LCD display, and may further include a touch screen display for additional user input modes. In some embodiments, the display 356 may be a bi-state display configured to maintain (i.e., without requiring on-going supply of energy) the display of particular data (e.g., characters and/or graphics) until the state (i.e., the data) for the bi-state display is changed/updated again. Further details regarding use of a bi-state display for some implementations of the device 300 are provided, for example, in U.S. Pat. No. 8,616,457, entitled "RFID display label for battery packs," the content of which is incorporated herein by reference in its entirety. The microphone/speaker 352 may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker 352 or to the controller 310 of the device of FIG. 3.

Figure 4:
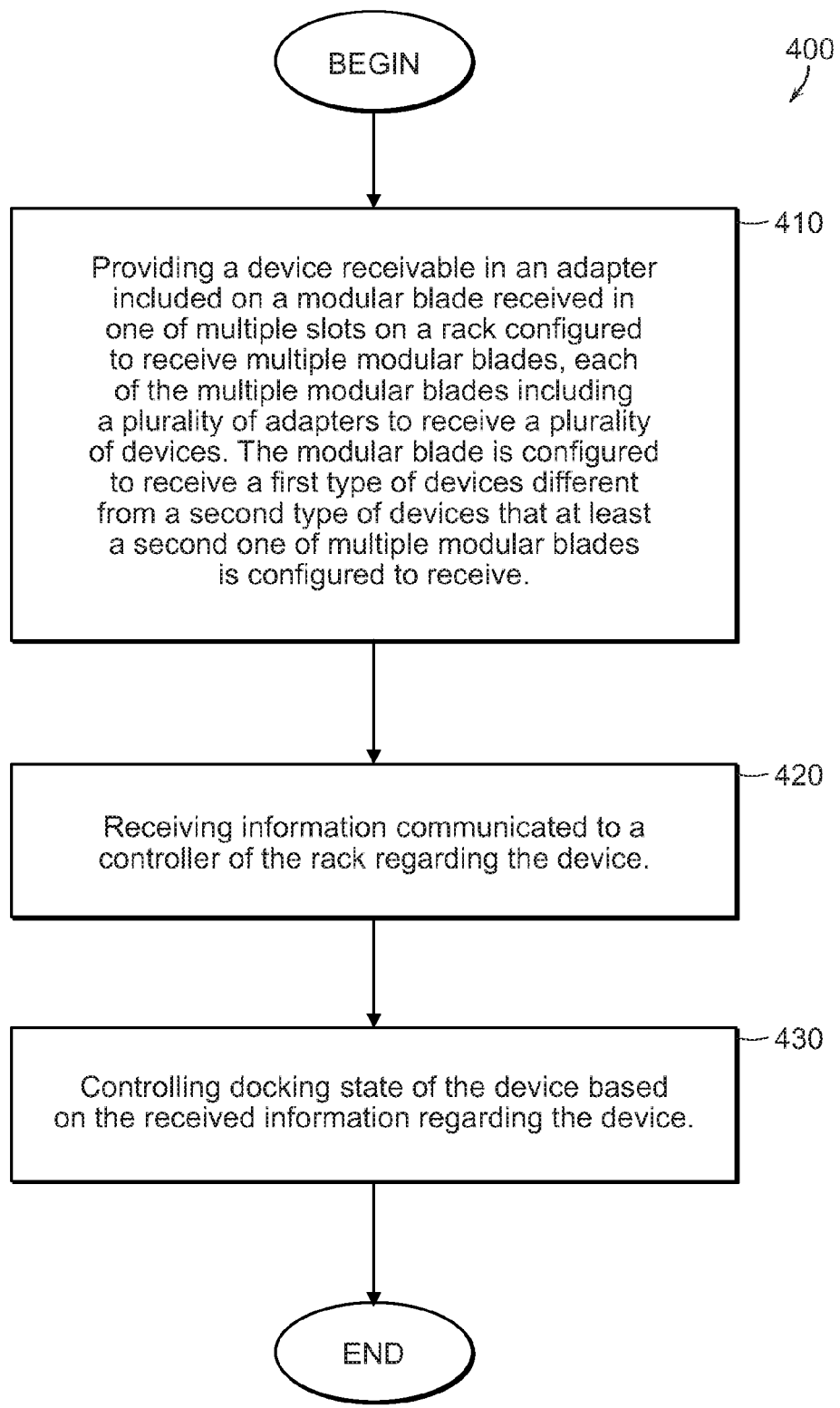
FIG. 4 is a flowchart of a procedure to manage and control inventory of devices.

With reference next to FIG. 4, a flowchart of an example procedure 400 to manage and control inventory of devices (such as mobile devices, electronic key tags, energy storage devices, etc.) is shown. The procedure 400 includes providing 410 a device (e.g., an electronic device, such as a mobile device) receivable in an adapter (e.g., electronic adapter) included on a modular blade received in one of multiple slots on a rack configured to receive multiple modular blades. Each of the multiple modular blades includes a plurality of adapters to receive a plurality of devices. The modular blade is configured to receive a first type of devices different from a second type of devices that at least a second one of multiple modular blades is configured to receive.

The procedure 400 further includes receiving 420 information communicated to a controller of the rack regarding the device. In some embodiments, the information may be communicated via a central user-interface of the rack (such as the interface 172 of FIG. 1) that allows a user to enter information relating to the device, or may be communicated from the device itself via a wireless communication module such as wireless transceiver, an RFID circuit, a barcode that can be scanned, and/or information entered through a user-interface of the device (with such user-entered information being sent wirelessly or through a wired link). The information may include data representative of the device identity, device characteristics (device type, device location, current power level of the device is an electronic device with an energy storage unit), docking requests (mount the device into the rack, or release the device if the device is currently docked into the rack), temporal information (date and time), etc. In some examples, the controller may be configured to, detect (and consequently establish an electrical connection)

that the device has been fitted within the adapter (if electrical contacts of the adapter form an electrical connection with electrical contacts of the electronic device). The controller may also be configured to detect wireless transmissions from the device that are within some predetermined range from the rack. The exchange of communication between the controller (and/or its communication module) may be initiated by either the device or by the controller.

With continued reference to FIG. 4, the procedure 400 also includes controlling 430 docking state of the device based on the received information regarding the device. For example, in embodiments in which the device is mounted onto the adapter, controlling the docking state may include releasing the mounted device in response to a determination that a release message (communicated wirelessly or through a wired connection) received in relation to the mounted electronic device is associated with an authorized user. The authorization may be performed using an authentication engine of the controller of the rack (such as an engine may be locally housed, or remotely connected to the rack), which is configured to verify the correctness of an authorization code that may have been provided by the user or to confirm (e.g., based on cryptographic signatures) that the message originated from a user or a device that are authorized to release the mounted device.

As noted, in some implementations, releasing the mounted device may include controllably releasing a rotatable lever (such as one of the rotatable levers depicted in FIGS. 2A-B) included in a neighboring blade, the rotatable lever configured to be rotatable moveable between a first release position and at least a second lock position. In the at least second lock position, the rotatable lever physically inhibits removal of the mounted device received in the adapter of modular blade. Controlling the docking state of the device may also include causing power charging of the mounted device in response to a determination that a power level of the mounted device is below a reference power threshold level.

Figure 5:
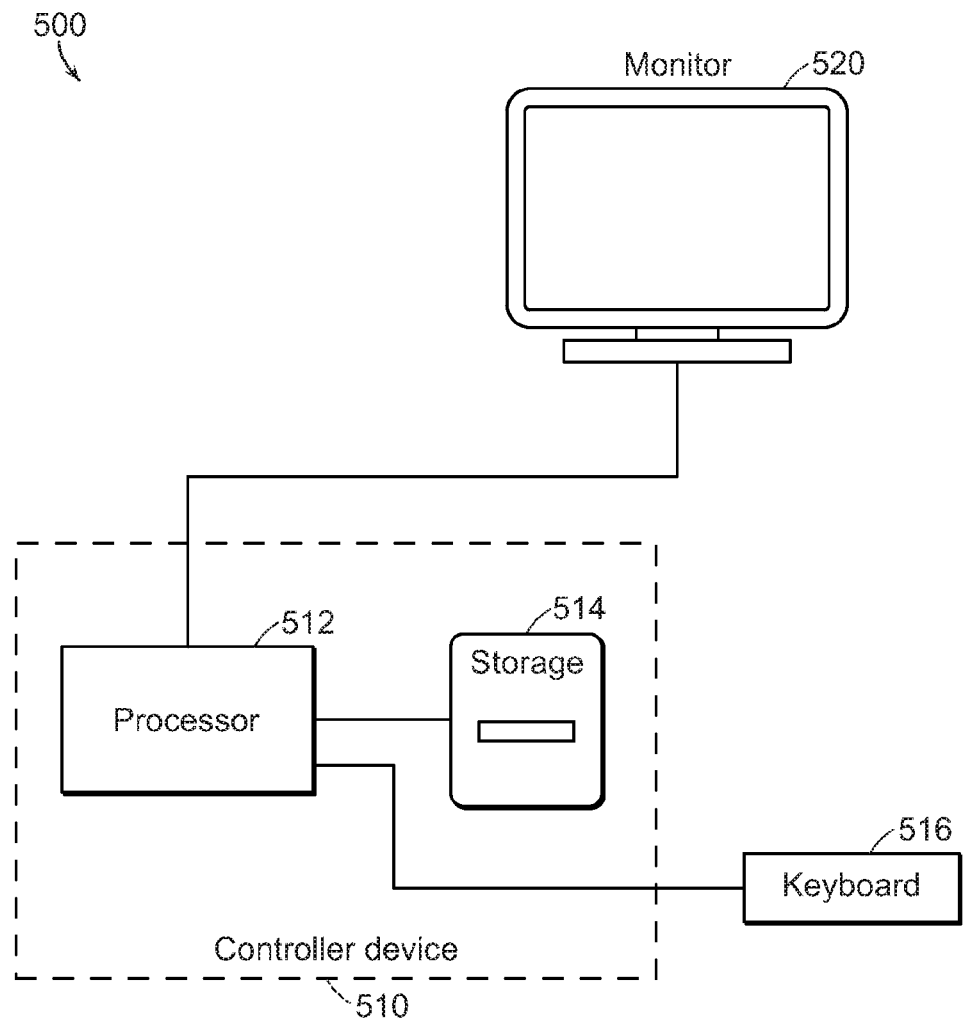
FIG. 5 is a schematic diagram of a controller-based device that may be used to implement, at least partly, some of various devices and nodes depicted in FIGS. 1 and 3.

Performing the various operations described herein may be facilitated by a processor-based computing system. Particularly, each of the various systems/devices described herein may be implemented, at least in part, using one or more processing-based devices such as a computing system. With reference to FIG. 5, a schematic diagram of a computing system 500 is shown. The computing system 500 includes a controller-based device 510 such as a personal computer, a specialized computing device, and so forth, that typically includes a central processor unit 512. In addition to the CPU 512, the system includes main memory, cache memory and bus interface circuits (not shown). The controller-based device 510 may include a mass storage element 514, such as a hard drive or flash drive associated with the computer system. The computing system 500 may further include a keyboard, or keypad, or some other user input interface 516, and a monitor 520, e.g., an LCD (liquid crystal display) monitor, that may be placed where a user can access them.

The controller-based device 510 is configured to facilitate, for example, the implementation of operations to control device distribution management (e.g., inventory control), charging operation, and other operations as described herein. The storage device 514 may thus include a computer program product that when executed on the controller-based device 510 causes the controller-based device to perform operations to facilitate the implementation of the above-described procedures and operations. The controller-based device 510 may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to allow general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 500. Other modules that may be included with the controller-based device 510 are speakers, a sound card, a pointing device, e.g., a mouse or a trackball, by which the user can provide input to the computing system 500. The controller-based device 510 may include an operating system, e.g., Windows XP® Microsoft Corporation operating system. Alternatively, other operating systems could be used.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A device dispensing system comprising:
    a rack comprising multiple slots to receive multiple modular blades, each of the multiple modular blades including a plurality of adapters to receive a plurality of devices;
    one or more modular blades received within respective one or more of the multiple slots, with at least a first one of the one or more modular blades configured to receive a first type of devices different from a second type of devices that at least a second one of the one or more modular blades is configured to receive; and
    a controller configured to control device docking for one or more devices receivable into respective one or more of adapters provided in the one or more modular blades received within the respective one or more of the multiple slots, to establish an electrical connection between the one or more devices and at least the controller.

2. The system of claim 1, wherein the one or more modular blades comprises at least one of: a mobile device blade with multiple mobile device cradles to receive multiple mobile devices, a charger blade with multiple charger cradles to receive multiple energy storage devices, or a key blade with multiple ports to receive multiple electronic key tags.

3. The system of claim 1, wherein the one or more modular blades comprises:
    a mechanical locking blade received within one of the multiple slots, the mechanical locking blade comprising multiple locking devices each configured to control physical removal of a corresponding device received within an adapter arranged in a neighboring blade received within a neighboring slot on the rack.

4. The system of claim 3, wherein the multiple locking devices each comprises:
    a rotatable lever rotatably moveable between a first release position and at least a second lock position, wherein in the at least second lock position, the rotatable lever physically inhibits removal of an associated neighboring device received in an adapter of an adjacent blade received in an adjacent slot of the rack.

5. The system of claim 4, wherein the rotatable lever is configured to be rotatably moved between the first and the at least second position in response to a control signal from the controller generated upon a determination of a change in a docking state of the associated neighboring device.

6. The system of claim 1, wherein the controller configured to control device docking for the one or more devices is configured to:
    electrically control docking state of an electronic device lockable into an adapter of one of multiple adapters of a blade installed into a slot in the rack; and
    record docking information related to the release or docking of the electronic device, the docking information comprising one or more of: identity information for the electronic device, identity of a user receiving or returning the electronic device, temporal information related to the docking or release of the electronic device, or power measures for the electronic device.

7. The system of claim 6, further comprising:
    a charging system configured to controllably transmit power to the electronic device in response to a determination that the electronic device is locked into the adapter of the one of multiple adapters of the blade installed into the slot in the rack.

8. The system of claim 7, wherein the charging system comprises a wireless power transfer system to inductively charge the electronic device.

9. The system of claim 6, further comprising a communication module to communicate with remote devices, including with the electronic device;
    wherein the controller is configured to:
        receive, via the communication module, one or more communication messages relating to the electronic device;
        determine, based on the one or more communication messages relating to the electronic device, whether the one or more communication messages include a valid access authorization to dock or release the electronic device; and
        cause docking or release operations for the electronic device in response to a determination that the received one or more communication messages includes the valid access authorization.

10. The system of claim 9, wherein the controller configured to receive the one or more communication messages relating to the electronic device is configured to:
    receive a message of the one or more messages from a rack user interface provided for the device dispensing system; or
    receive another message, of the one or more messages, communicated from the electronic device, wherein the other message is communicated through one of: a wireless link between the electronic device and the communication module, or a wired link established between the electronic device and the communication module.

11. The system of claim 10, wherein the controller configured to receive, via the communication module, the other message communicated through the wireless link is configured to receive one or more of: a wireless short-range communication signal, a wireless medium range communication signal, or a wireless long-range communication signal.

12. The system of claim 11, wherein the wireless short-range communication signal comprises one or more of: an RFID signal, a Bluetooth® signal, or a Bluetooth Low Energy (BLE®) signal.

13. The system of claim 1, wherein the controller is further configured to:
controllably actuate user-interface indicators, associated with adapters included with at least one of the one or more modular blades, to communicate information in relation to devices receivable within the adapters.

14. The system of claim 13, wherein the user-interface indicators are configured to indicate, for a particular adapter and a particular corresponding device, one or more of: a release indication to prompt a user to remove the particular corresponding device from the particular adapter, a vacant indication identifying the particular adapter as being unoccupied, or a charging indication to indicate an in-progress charging operation for the particular corresponding device received in the particular adapter.

15. A method, comprising:
providing a device receivable in an adapter included on a modular blade received in one of multiple slots on a rack configured to receive multiple modular blades, each of the multiple modular blades including a plurality of adapters to receive a plurality of devices, wherein the modular blade is configured to receive a first type of devices different from a second type of devices that at least a second one of multiple modular blades is configured to receive;
receiving information communicated to a controller of the rack regarding the device; and
controlling docking state of the device based on the received information regarding the device.

16. The method of claim 15, wherein the device is mounted onto the adapter, and wherein controlling the docking state comprises:
releasing the mounted device in response to a determination that a release message received in relation to the mounted electronic device is associated with an authorized user.

17. The method of claim 16, wherein releasing the mounted device comprises:
controllably releasing a rotatable lever included in a neighboring blade, the rotatable lever configured to be rotatably moveable between a first release position and at least a second lock position, wherein in the at least second lock position the rotatable lever physically inhibits removal of the mounted device received in the adapter of modular blade.

18. The method of claim 15, wherein controlling the docking state of the device comprises:
causing power charging of the mounted device in response to a determination that a power level of the mounted device is below a reference power threshold level.

19. A mechanical lock system comprising:
a mechanical locking blade received within one of multiple slots on a rack configured to receive multiple modular blades that each includes a plurality of adapters to receive a plurality of devices, with at least a first one of the multiple modular blades configured to receive a first type of devices different from a second type of electronic devices that at least a second one of the multiple modular blades is configured to receive, the mechanical locking blade comprising multiple locking devices configured to control physical removal of respective devices received within a plurality of adapters of a neighboring blade fitted within a neighboring slot of the rack;
the neighboring blade, fitted within the neighboring slot on the rack, and comprising the plurality of adapters, the plurality of adapters positioned so that respective ones of the multiple locking devices are configured to be moved to control access to the plurality of adapters; and
a controller configured to control movement of the multiple locking devices based on access authorizations determined for the respective devices associated with the plurality of adapters of the neighboring blade.

20. The system of claim 19, wherein the multiple locking devices each comprises:
a rotatable lever rotatably moveable between a first release position and at least a second lock position, wherein in the at least second lock position the rotatable lever physically inhibits removal of an associated neighboring device received in a neighboring adapter of the neighboring blade received in the neighboring slot of the rack.

* * * * *